United States Patent [19]
Morrison

[11] 4,419,686
[45] Dec. 6, 1983

[54] DIGITAL CHROMINANCE FILTER FOR DIGITAL COMPONENT TELEVISION SYSTEM

[75] Inventor: Eric F. Morrison, Redwood City, Calif.

[73] Assignee: Ampex Corporation, Redwood City, Calif.

[21] Appl. No.: 231,278

[22] Filed: Feb. 4, 1981

[51] Int. Cl.³ .............................................. H04N 9/32
[52] U.S. Cl. ..................................................... 358/13
[58] Field of Search ......................................... 358/13

[56] References Cited

U.S. PATENT DOCUMENTS 4,037,248 7/1977 Iijima et al. ........................... 358/13

OTHER PUBLICATIONS

SMPTE Task Force on Component Digital Coding Suggestions for a Worldwide Compatible Digital Code for Television Studios, 4-1-80.

*Primary Examiner*—Richard Murray
*Attorney, Agent, or Firm*—Donald L. Bartels; George B. Almeida; Joel D. Talcott

[57] ABSTRACT

A digital chrominance signal in a digital component television system is digitally filtered to obtain sampling values intermediate the sampled values obtained during analog to digital conversion of the chrominance signal, such that the resultant number of chrominance samples per second in the digitized chrominance signal corresponds with the number of luminance samples per second in the digitized luminance signal. The samples values of the digitized chrominance signal including the computed intermediate values may also be modified by said digitized filter to minimize the alias created by the analog to digital correction sampling process, to compensate this signal for sine x/x losses existing in the digitized chrominance signal, to compensate for Gaussian filter attenuation of the chrominance signal prior to analog to digital conversion thereof, and to compensate for other deficiencies in the chrominance signal. The digital filter includes a network of at least one shift register and one digital adder that continuously calculates intermediate values between successive sample values of a digital chrominance signal, and incorporates said calculated values in a resultant chrominance signal.

13 Claims, 9 Drawing Figures

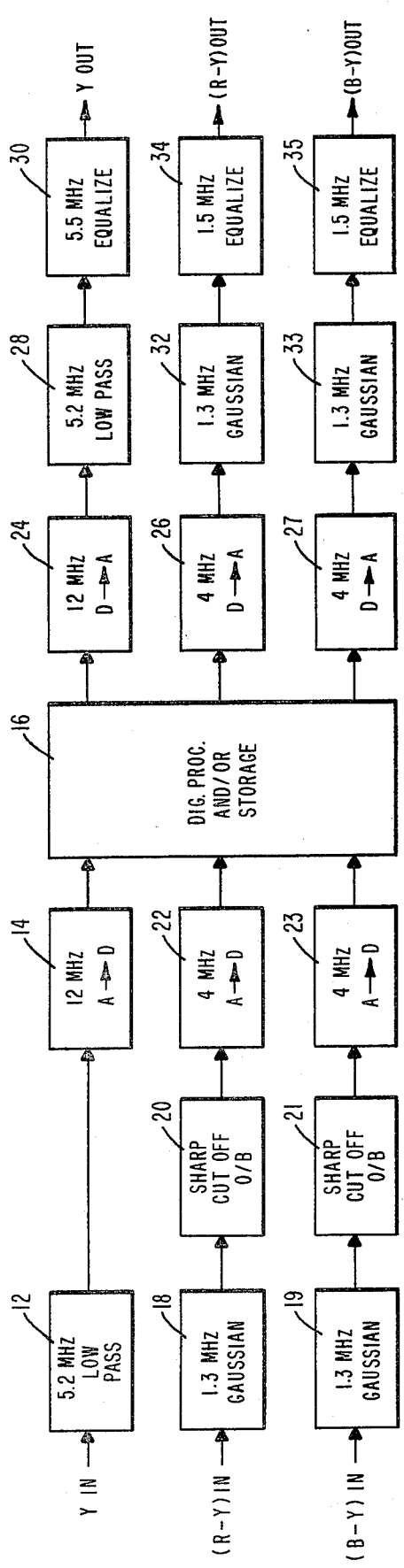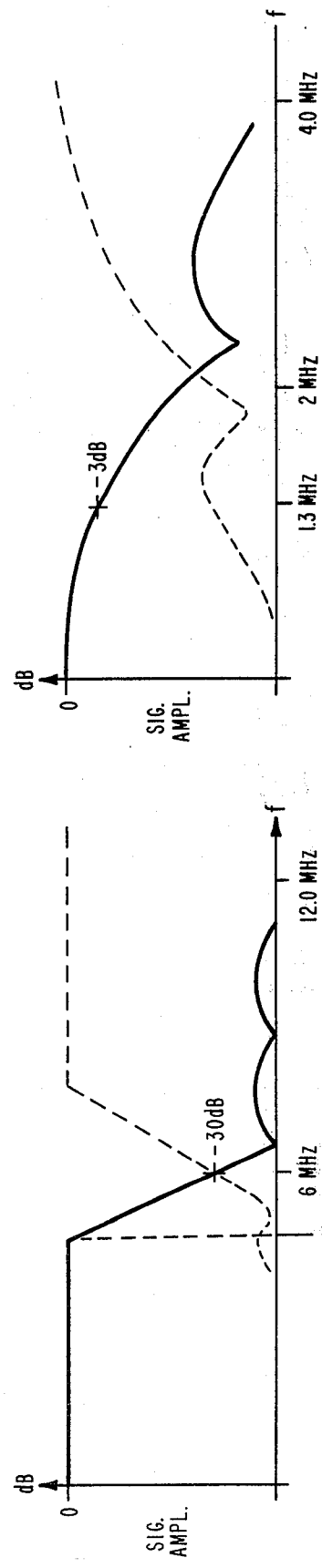

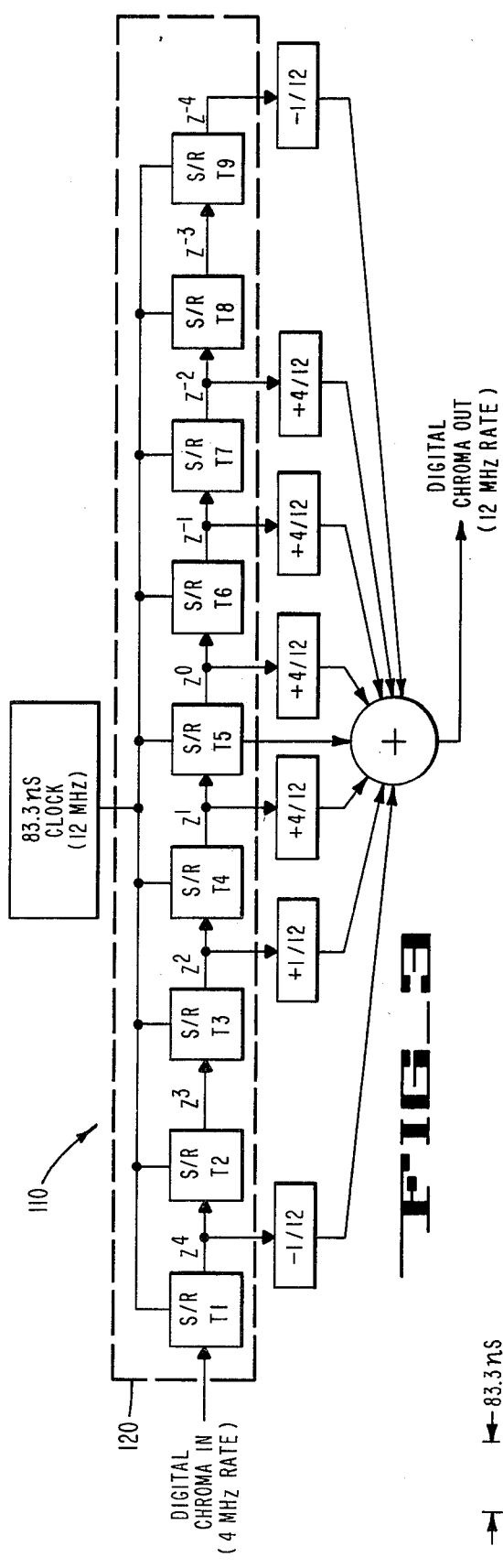
FIG_3
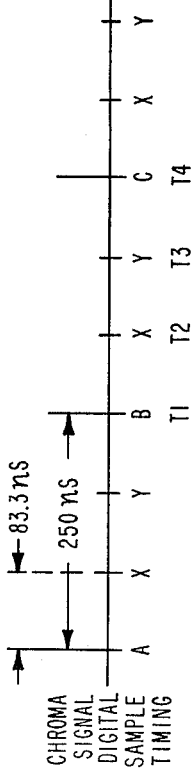
FIG_5A
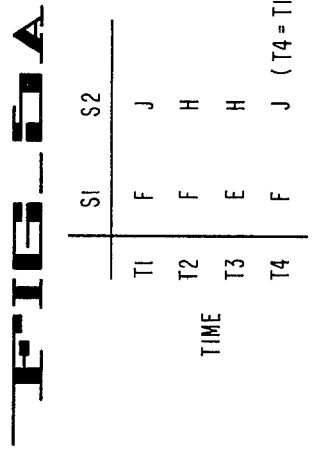
FIG_5B
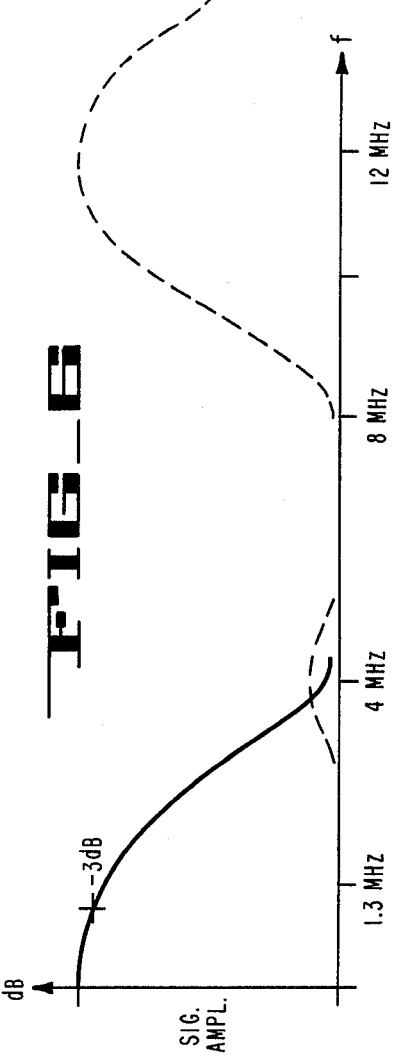
FIG_6

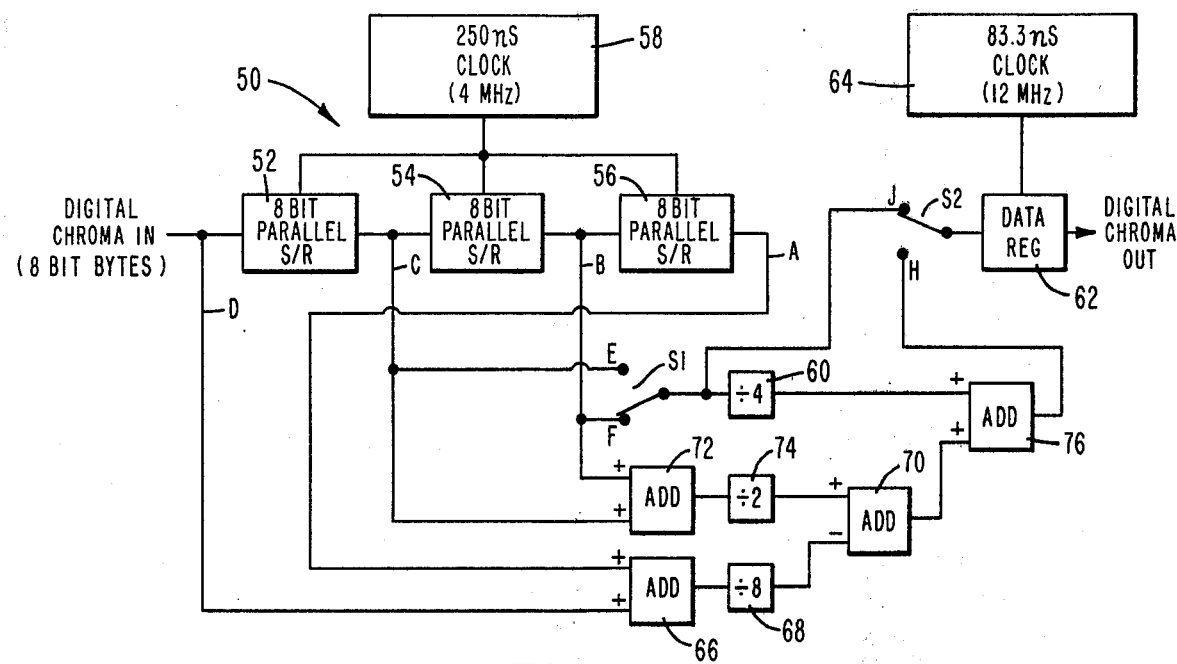
FIG_4
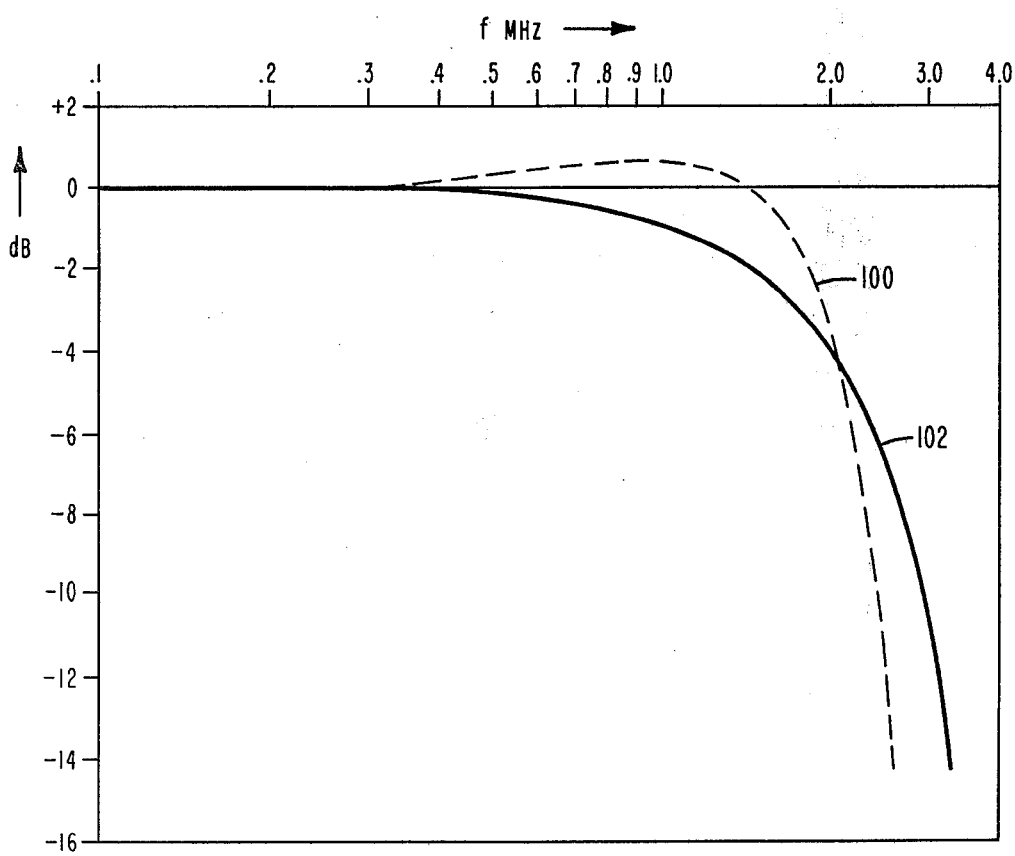
FIG_7

DIGITAL CHROMINANCE FILTER FOR DIGITAL COMPONENT TELEVISION SYSTEM

The present invention relates in general to an apparatus and method for digitally filtering a chrominance signal in a digital component television system, and, more particularly, to such an apparatus and method wherein intermediate values between successive chrominance sampled values are digitally computed, resulting in the existence of chrominance values occurring in time at a rate equal to the sampling rate of the luminance signal, and wherein these digital computations further enable said digitized chrominance signal to be compensated for deficiencies in said signal.

A new world-wide standard being discussed for television signals in the digital component standard, wherein the television signal is digitized for use in the broadcasting studios, or for tape storage, and only reconverted into an analog signal just prior to encoding of the signal into any of the frequently used standard systems for video transmission. The most common television signal standards are the NTSC, PAL and SECAM systems. A well known difficulty with these present systems is that it is extremely difficult to convert a television signal encoded in one standard to another standard. Thus, a television program encoded according to the SECAM standard cannot be used in those countries using some other standard. In addition, certain of the present systems have different line totals per frame of data; some use 525 horizontal lines, others use 625 lines, and still others use other line standards. A digital component standard would enable relatively easy conversion of television programs, since they would have been videotaped in a digital form prior to such encoding and because vertical interpolation of different line number formats is much easier in unencoded video signals.

Video systems wherein the television signal is digitized have been used in the prior art, especially in the special effects area. The difficulty in these systems has been that they have digitized the encoded signals, whether they are encoded in the NTSC, PAL, or some other standard. Digitizing did enable many different types of special effects to be created with these video signals, but it had the disadvantage that a large amount of successive television signal fields had to be kept track of to enable changes to be made in a given video scene. Two fields are required initially, since only a half of the lines in each video frame are scanned at a time, alternately the odd and the even fields, so that two fields are required to complete a given frame of video. When color is added in NTSC, four fields are required because the color subcarrier which contains the chrominance signals, defined below, are odd multiples. It is even more difficult in the PAL system which requires eight fields to describe a given color video scene. Consequently, when a given picture is stored in memory, all of these fields must be retained in their proper order, to enable the picture to be correctly processed and/or played back. Editing of a video tape containing such data is thus extremely difficult. Note also that the SECAM system, since it is an FM signal system, is even more difficult to work with because it is impossible to define chrominance information in terms of the digitized samples in such a system.

Some background on color television in general may be helpful at this point. In a color television camera system, three camera tubes are used to observe a given scene, with each tube made responsive to one of the three primary colors red, green, and blue. Electrical signals produced by these camera tubes are combined in such a way so as to reduce the total bandwidth required. To this end, a luminance signal y, proportional to the monochrome brightness signal, and two color difference signals, e.g. (R−y) and (B−y), are produced from the red, green and blue signals. The color difference signals are also called chrominance signals. This reduced bandwidth is enabled because, in a color television system, reliance is placed on the fact that the eye has very poor resolution to color transitional changes as compared to changes in brightness. Thus, for example, in the PAL system, the color difference or chrominance signals each have a bandwidth of about 1.3 MHz. The bandwidth of the luminance signal, however, is about 5.5 MHz.

The digital component standard eliminates the above problems, since it requires that the component signals from the camera tubes, i.e. the luminance signal and the two chrominance signals, to be immediately digitized before any television standard is used to encode these signals. The convenient aspect of this system is that, in unencoded video signals, a frame is always completed for a given scene in only two fields. The luminance and chrominance sampling rate is also preferably defined so that the digitized samples from each (obtained during analog to digital conversion of these signals) line up across each horizontal line and are thus line synchronous. Such a standard also enables easy vertical interpolation of the lines to generate, for example, a 625 line video frame from a 525 line video frame or vice versa.

The sampling rate to be used by the analog to digital converters to digitize these luminance and chrominance signals has not yet been finalized, but it is anticipated that the two chrominance signals will be sampled at a much lower sampling rate than the luminance signal, due to their lower required bandwidth. In the NTSC system, different bandwidths are used for the two color difference signals, but the bandwidth of the maximum channel corresponds to the 1.3 MHz bandwidth of the PAL chrominance channels. Therefore, for the sake of the digital component standard, both of the color difference channels will have this larger bandwidth.

Note that according to the Nyquist criterion, the minimum sampling frequency of an analog to digital converter must be at least twice the bandwidth of the signal being digitized. Thus, if the bandwidth is 1.3 MHz, the sampling frequency must be greater than 2.6 MHz. The luminance signal bandwidth is typically about 5.0 to 5.5 MHz, so that the sampling frequency for this signal must be at least 11 MHz. Thus, one of the digital component sampling standards that has been processed is sampling the luminance at 12 mega-samples/second (ms/s) and the two chrominance signals at 4 mega-samples/second, that is, a 12-4-4 ms/s sampling standard, for a total of 20 mega-samples/second for the whole block of color data. Alternate proposed sampling rates include 12-6-6 ms/s and 14-7-7 ms/s sampling. The difficulty with sampling rates higher than any minimum sampling rate, which would probably be the 12-4-4 ms/s rate, is the burden it places on any recording medium, since obviously the more samples per second that one needs to record, the more recording space per second is needed. On the other hand, a sampling rate that is too low becomes a problem due to the effects of the sampling time on the analog signal being sampled. In other words, the sampling process usually produces an alias resulting from higher frequency signals on the waveform as it is being converted by the A to D converter. These alias signals appear as a distortion when the signal is subsequently converted back from a digital signal into an analog signal. This distortion becomes much more apparent at low sampling rates.

If information in the signal being digitized has a frequency above the Nyquist limit of one-half the sampling frequency, which is also usually defined to be above the normal band edge of the signal, that information after sampling produces a modulation component equal to $F_C$, the sampling frequency minus $F_M$, the frequency of this higher frequency information. Therefore, for any $F_M$ greater than the Nyquist limit of $F_C/2$, the alias generates a spurious signal in the pass band, a spurious signal of a frequency less than $F_C$. This alias signal is retained in the signal during any further processing once the signal is reconverted into an analog signal such distortion cannot be separated from the desired signal by any further filtering.

To eliminate the creation of an alias by an A to D converter, one would need an ideal filter having the characteristics of a "brick wall," i.e. a filter having no attenuation to $F_C/2$, one-half the sampling frequency, and a signal cutoff of infinite slope for all frequencies above this Nyquist point.

In digital component systems, it has been anticipated in the prior art that before the analog to digital conversion takes place, a Gaussian filter is needed to filter each of the chrominance signals, to thereby reduce this aliasing problem. A Gaussian filter is desirable, since it filters with uniform delay. That is, any delay created by this filtering process is uniform for all frequencies, so that no overshoot or ringing in the filtered signal is created. Non-Gaussian filters generally create signal delays that increase with frequency. Gaussian filters are even more important due to the low bandwidth of the chrominance signals. In addition to the Gaussian filter, however, a low pass filter that has a sharp cutoff frequency beyond the cutoff frequency of the chrominance signals is helpful. This latter filter is needed to reduce the amplitude of the alias existing outside of the chrominance pass band that is produced by the relatively gentle attenuation slope of the Gaussian filter.

The difficulty with this prior art approach is that a component of the alias still is generated within the pass band of each of the chrominance signals. In addition, the sampling process itself creates a sine x/x loss in the chrominance signal, and the Gaussian filter attenuates the amplitude of the chrominance signal at higher frequencies inside the chrominance signal pass band. Sine x/x losses occur, and are greater at lower sampling rates, simply because the sampling process of analog to digital conversion only generates a signal of an energy that is the average of the original signal. This creates an amplitude error component that decreases in effect with increasing frequency. The slope of this error has the shape of a sine x/x curve. These defects in the digitized chrominance signal are generally not discernible in ordinary viewing, once the signals have been reconverted into analog form and transmitted by the broadcaster out to a television receiver. The problem is much more critical, however, in those situations where, while digitized, the chrominance signals are used in further signal processing within the broadcasting plant to create various special effects. For example, in chroma-keying, the chrominance signals are used to create new luminance information. Basically chroma-keying requires that the chrominance and luminance be multiplied together. If the chrominance is a significantly narrower bandwidth signal than the luminance, the low frequency spurious signals generated thereby are quite obvious in the visible spectrum of the wide band final signal, e.g., comprising visually irritating erroneous color changes, etc.

Finally, in the prior art, to preserve the transient response of the chrominance signal, after D to A conversion has been completed, an additional Gaussian filter is needed. This Gaussian filter can have a bandwidth that is no wider or narrower than the input Gaussian filter. A narrower bandwidth would just degrade the amplitude response of the chrominance signal further, and a wider bandwidth would not do the job of getting rid of any alias that exists out of the pass band of the chrominance signal. The problem with using a Gaussian filter is that, because of its slow roll off characteristics at the chrominance pass band cutoff frequency, it creates additional attenuation at each point on the response curve of an amplitude equal to the unwanted attenuation created by the input Gaussian filter. Thus, instead of having a signal with only 3 dB degradation at the high end of the pass band, the degradation now would be 6 dB. The result would be a system whose chrominance signals would be outside of its desired performance specifications.

Therefore, an object of the present invention is to provide a digital system transparent to the analog signal being digitally processed, i.e. a system that creates no added distortions in the analog signal, by providing a digital filter that acts to substantially limit the generation of any alias signals in the pass band of the chrominance signal.

A further object of the present invention is to provide such a digital filter that compensates for any sine x/x losses occurring during the sampling process of the analog to digital converter.

Another object of the present invention is to compensate for Gaussian filter attenuation of the chrominance signals prior to analog to digital conversion of said signals and to eliminate the need for such a Gaussian filter after the digitized chrominance signals have been reconverted into an analog signal.

Yet another object of the present invention is to provide means for increasing the apparent sampling rate of the digitized chrominance signals to enable the increased bandwidth of said signals obtained thereby to be used in subsequent digital processing of these digitized signals in such a manner that distortions are substantially eliminated.

Still another object of the present invention is to increase the apparent sampling rate of the chrominance signals so that the subsequent D to A conversion of said signals are performed at a higher frequency, such that said filtering does not affect the normal pass band response of the chrominance signals.

These and other objects and advantages of the present invention will become apparent upon reference to the accompanying drawings and following description in which:

FIG. 1 is a block diagram of an exemplary prior art digital component television system;

FIGS. 2A and 2B diagram respectively the frequency spectrum of the luminance and chrominance signals according to the component television system of FIG. 1;

FIG. 3 is a block diagram of an exemplary ideal digital filter according to the present invention;

FIG. 4 is a block diagram of an exemplary preferred digital filter according to the present invention;

FIG. 5A is a timing diagram for exemplary intermediate values x and y between adjacent chrominance sampled values A–D, and FIG. 5B is a timing chart of the operation of switches S1 and S2 in the digital filter of FIG. 4, between time T1 and T4;

FIG. 6 is a diagram of the frequency spectrum of a chrominance signal augmented according to the present invention as output by a D to A converter; and FIG. 7 is a diagram of frequency response curves showing the effect of sine x/x loss compensation obtained with the digital filter of FIG. 4.

Broadly stated, the present invention is directed to an apparatus and method for digitally computing in a digitized chrominance signal at least one intermediate value between adjacent successive chrominance sampled values, and further operating on said values to allow compensation in the characteristics of said signal to compensate for sine x/x losses occurring in a prior sampling process when said chrominance signal was first digitized, to compensate for losses and attenuation caused by any Gaussian filtering prior to digitization of the chrominance signal, to minimize aliasing errors in the signal, and to minimize other signal distortions. Such an augmented chrominance signal is beneficial in subsequent digital processing of the chrominance signal for special effects and other purposes, and provides advantages resulting from the higher effective sampling rate created, enabling subsequent digital to analog conversion to be completed at substantially reduced distortion in the chrominance signal and enabling the signal, once converted into analog form, to only need a fairly high band sharp-edge low pass filter, and not a Gaussian filter.

Referring now to FIG. 1, illustrated is a block diagram 10 of an exemplary prior art digital component television system. As seen in FIG. 1, the y luminance signal is fed to a 5.2 MHz low pass filter 12 to eliminate out of band signals above this frequency, before it is fed into a 12 MHz sampling rate analog to digital converter 14. After A to D conversion, the luminance signal is fed to the broadcasting plant digital processing systems, to tape storage media, etc., as diagramatically illustrated at 16. The input analog chrominance signals are similarly filtered before analog to digital conversion, but since they are of lower bandwidth, each chrominance signal, identified as (R−y) and (B−y) are fed to respective 1.3 MHz Gaussian filters, shown at 18 and 19, and then fed to respective low pass filters 20 and 21. Filters 20, 21 each generate a sharp cutoff at a frequency sufficiently outside of the band (O/B) to limit any generation of aliasing error signals other than those generated in or near the chrominance pass band by the Gaussian filters 18 and 19. The signal outpt from each of these filters is fed to respective 4 MHz analog to digital converters 22 and 23 for input to the digital processing broadcasting plant 16 described above.

As previously mentioned, the final sampling rate standard for these analog to digital converters 14, 22 and 23 has not yet been determined. Consequently, the present invention is designed to be usable with any sampling rate standard devised, with the 12-4-4 ms/s sampling system shown in FIG. 1 being used herein for explanatory purposes only.

When one is ready to encode and transmit the television signal, the digitized luminance signal and the two digitized chrominance signals are output from the digital processing plant 16. These signals are fed to respective digital to analog converters 24, 26 and 27. The digitized luminance signal is fed to a 12 MHz D to A converter 24. The analog signal created thereby is filtered by a 5.2 MHz low pass filter 28 and the sine x/x loses in the signal are subsequently equalized with a 5.5 MHz filter 30. The output of filter 30 is a compensated analog luminance signal which can thereafter be encoded with the reconverted analog chrominance signals into the PAL, NTSC or other television standard, as desired by the system user, for output transmission of the video signal.

The two chrominance signals are converted by 4 MHz D to A converters 26 and 27. The resultant analog signals are also filtered, but in this case by 1.3 MHz Gaussian filters 32 and 33 and by 1.5 MHz sine x/x equalizing filters 34 and 35. Gaussian filters again are needed to provide uniform delay during the filtering process.

As previously described, the drawback of this system for the chrominance signals is that using Gaussian filters both at the input and the output to the digital component system 10 creates unacceptable additive attenuation losses in the signal at the higher frequencies of the chrominance signal bandwidth. In addition, alias signals are generated both due to the sampling rate of the A to D converter and also due to the slow slope of the Gaussian filters. These alias signals create distortions in the digitized chrominance signals of a magnitude such that, when such signals are used for special effects or other processing purposes requiring greater bandwidth or less error, these distortions are irritatingly visible in the resultant video picture.

FIGS. 2A and 2B diagram respectively the frequency spectrum of the luminance and chrominance signals according to the component television system 10 illustrated in FIG. 1. As seen in FIG. 2A, the luminance signal has essentially a flat response to 5.2 MHz and is about 30 dB down at one half the 12 MHz sampling frequency of the analog to digital converter 14 of the present example. This 6 MHz point is the Nyquist point of this system. Note that A to D converter 14 also creates an alias, illustrated as the dashed line in FIG. 2A. However, this alias only has a small component extending back into the luminance pass band below 5.2 MHz.

FIG. 2B illustrates the frequency spectrum of each of the chrominance signals, and shows that the Gaussian filter 18 or 19 does attenuate the chrominance signal at higher pass band frequencies, such that the frequency response is 3 dB down at the high end, 1.3 MHz, of the chrominance bandwidth. The bandpass attenuation of the Gaussian filter is described by the following formula:

$$\text{Relative attenuation (dB)} = 3\left(\frac{\omega}{\omega - 3dB}\right)^2$$

and the attenuation rate is 12 dB per octave. Note that above about 2 MHz the sharper out of band cutoff filter creates a steeper slope in the chrominance response curve. Note also that at the Nyquist point of 2 MHz, which is half of the sampling rate of each of the chrominance A to D converters 22 and 23, the chrominance signal is only 20 dB down due to the more gentle attenuation slope of the Gaussian filter. The alias generated by the 4 MHz sampling of the chrominance A to D converter, as a result of the gentle slope of the Gaussian filter response, is illustrated with a dashed line in FIG. 2B.

After D to A conversion, the luminance signal is filtered by another 5.2 MHz low pass filter 28 which also has a flat response out to 5.2 MHz, and therefore the distortion of this signal by the digitizing process is minimal. However, the two chrominance signals need to be filtered again, respectively, by Gaussian filters 26 and 27. Note that these second Gaussian filters attenuate the chrominance pass band response, such that at the 1.3 MHz pass band limit, instead of being attenuated 3 dB down, these signals are attenuated an amount equal to twice that, or 6 dB down. Such a response is outside the specification defined for such signals in a television system, and are therefore inadequate.

The present invention, by digital filtering each of the chrominance signals, enables the attenuation effect of the input Gaussian filters, the aliasing generated by the A to D conversion as a result of such filters, and the sine x/x losses generated by the sampling process of the chrominance A to D converter to be compensated. This digital filter according to the present invention also enables the output digital to analog converters 26, 27 to operate at a higher frequency, thereby eliminating the need for an output Gaussian filter, as required in the prior art system of FIG. 1 at 32 and 33, or the need for an analog sine x/x equalizer 34 or 35. According to the present invention, the only processing needed by the resultant analog chrominance signal will be a sharp-edge low pass filter, similar to the low pas filter used for the luminance signal in FIG. 1, wherein this frequency edge is well outside of the chrominance pass band. The means by which this is accomplished is described hereinbelow.

FIG. 5A is a timing diagram of an exemplary digitized chrominance signal having chrominance sampled instants or values at A, B, C and D. If the chrominance signal is sampled at a rate of 4 MHz, the analog to digital converter 22, 23 generates a digitized chrominance sampled value every 250 nanoseconds. The digital filter according to the present invention is designed to interpolate the chrominance sampled values such that the effective sampling rate is preferably increased to such a degree that it is equal to rate of the digitized luminance samples. If the luminance signal is sampled at a 12 MHz rate, sampled values are therefore needed every 83.3 nanoseconds. Thus, as seen in FIG. 5A, what is preferred is a digital filter which will compute a certain number of intermediate values for the chrominance signal between each successive pair of samples thereof, to enable the digitized chrominance signal to correspond to match the total number of luminance samples per unit time. Such intermediate samples are indicated at points in time x and y between samples B and C in FIG. 5A, for example. Note that depending on the ratio of the sampling rate of each of the chrominance signals to that of the luminance signal, one, two, three or more intermediate values may be needed to be calculated to increase the sampling rate of the chrominance signal to preferably equal the sampling rate of the luminance signal. Since in this example, the luminance rate is 3 times the chrominance rate, as input to the digital filter, two intermediate values need to be calculated between each adjacent chrominance sampled value, to enable each of the chrominance signals to have an effective 12 ms/s sampling rate equal to the luminance sampling rate.

Of course, values for x and y could simply be obtained between sampling points B and C, for example, merely by averaging the values of the chrominance signal at B and C as a function of the distance in time of positions x and y with respect to B and C. Thus, x since it is closer to B would be equal to ⅔B plus ⅓C. y would correspondingly be equal to ⅓B+⅔C. The problem with this set of coefficients for x and y is that the amplitude response of such a filter decreases with increasing frequency, since this averaging function is simply an integration of the signal. Such a result is not satisfactory since it creates a pole that is well within the pass band, thereby creating a distortion in the resultant signal. Consequently a different set of coefficients needs to be obtained.

Since we know the transient response of the input filter to the analog to digital converter for each chroma signal, we know its response to a step input. Coefficients can be computed that closely approximately this response from a higher order filter using chrominance sampled values A, B, C and D. These higher order filter coefficients can also be modified to calculate intermediate chrominance values to compensate for sine x/x losses, Gaussian attenuation losses from the signal, etc. Note that the sampled values obtained at time A, B, C and D preferably are not also modified by this process, since they are values that are true representations of the analog signal at these points in time. The distortion arises from the lack of any data reflecting changes in the analog input signal that occur in time between adjacent samples. Thus, knowing the ultimate curve desired for the transient response, the formula for the curve can be obtained. In the present invention, since the digital filter is a 4 to 12 MHz interpolation filter, a curve having the approximate shape of the curve shown at 100 in FIG. 7 would compensate, out to one MHz, the chrominance signal input transient response curve, shown at 102. Curve 100 is a graph of the formula:

$$H = -1/6 \text{ cosine } 4\omega t + 1/6 \text{ cosine } 2\omega t + 4/6 \text{ cosine } \omega t + 4/12 \qquad (1)$$

This is where t=83.3 nanoseconds, or 1/12 MHz, previously described as being the period of the sampling frequency of the luminance signal. This curve has a sharp cutoff above 2.0 MHz, as required. To construct the filter, it is necessary to convert the formula into "Z" parameters. Converting formula (1) to its complex exponential form gives:

$$H = -1/12(e^{j4\omega t} + e^{-j4\omega t}) + 1/12(e^{j2\omega t} + e^{-j2\omega t}) + 4/12(e^{j\omega t} + e^{-j\omega t}) + 4/12 \qquad (2)$$

Since $e^{j\omega t}$ may be transposed to Z where $Z = e^{j\omega t}$, this results in $$H = -1/12Z^4 + 1/12Z^2 + 4/12Z^1 + 4/12Z^0 + 4/12Z^{-1} + 1/12Z^{-2} - 1/12Z^{-4} \qquad (3)$$

An ideal digital filter 110 according to this equation is illustrated in FIG. 3. As can be seen in FIG. 3, although the original data occurred in 250 nS blocks, this data is clocked through the delays T1 throughout T9 at 3 times that rate, a 12 MHz rate. This is enabled by a shift register 120 having nine taps, which are respective outputs of the shift registers T1-T9. When an original sample resides in registers T1, T2 and T3 or T7, T8 and T9 the output contribution of that sample $= -1/12 + 1/12 = 0$. When the original sample resides in T4, T5 and T6, the output contribution is $4/12 + 4/12 + 4/12 = 1$, so that the original sample appears at the output. This corresponds to timing instants A, B, C and D of FIG. 5A. As a result these sampled values are output unchanged from filter 110.

Assume that at one point in time, sample A resides in T7, T8 and T9, sample C resides in T1, T2 and T3 and sample D appears at the input of T1. The output will be sample B corresponding to point B on FIG. 5A. If the next increment of the clock represents point x on FIG. 6, the output for x is:

$$x = -1/12D\,(T1) + 1/12C\,(T3) + 4/12C\,(T4) + \qquad (4)$$
$$\quad 4/12B\,(T5) + 4/12B\,(T6) + 1/12B\,(T7) - 1/12A\,(T9)$$
$$= -1/12D + 5/12C + \tfrac{3}{4}B - 1/12A$$

If the clock is incremented one more time to point y on FIG. 6 the output for y is:

$$y = -1/12D\,(T1) + 1/12C\,(T3) + 4/12C\,(T4) + \qquad (5)$$
$$\quad 4/12C\,(T5) + 4/12B\,(T6) + 1/12B\,(T7) + 1/12A\,(T9)$$
$$= -1/12D + \tfrac{3}{4}C + 5/12B - 1/12A$$

If the clock is further incremented one more time to point C in FIG. 5A, sample C appears at T4, T5, T6 contributing unity output. Samples B and D appear at T1, T2 and T3, and T7, T8 and T9 respectively, contributing zero output.

The above formulas (4) and (5) for x and y however, enable the use of shift registers operating at the original data rate of 4 MHz, and further enable the arithmetic operators to time share the arithmetic operations. As will be seen, this simplifies the hardware implementation of the filter by reducing the number of shift registers from nine to three.

Since the above described coefficients for x and y are a little difficult to implement in a digital binary filter, in the preferred embodiment the coefficients are modified slightly. Thus, the following coefficients for x and y are chosen:

$$x = \tfrac{3}{4}B + \tfrac{1}{2}C - \tfrac{1}{8}A - \tfrac{1}{8}D \qquad (6)$$
$$y = \tfrac{3}{4}C + \tfrac{1}{2}B - \tfrac{1}{8}A - \tfrac{1}{8}D \qquad (7)$$

FIG. 4 is a block diagram of an exemplary preferred digital filter having three shift registers according to the present invention, for obtaining values of the coefficients of x and y according to the above formulas (6) and (7). As seen in FIG. 4, since each sampled value of the digital chroma signal is a multibit word or byte, each byte is input to exemplary digital filter 50 in parallel, and then serially coupled through each of the three parallel shift registers 52, 54 and 56 as a function of the timing of clock 58. In the present embodiment, the digital chroma signal is an 8-bit word, but more or less bits may be used, depending on signal amplitude accuracy desired. Each byte is shifted into shift registers 52-56 every 250 nanoseconds by clock 58, corresponding to the sampling rate of the digitized chrominance signal as output by the analog to digital filter 22 or 23. The output of each of these shift registers 52-56 are fed to a plurality of adders and dividers and two switches S1 and S2 to obtain the intermediate calculated samples x and y.

Referring to FIGS. 5A and 5B, the intermediate values are calculated at times T2 and T3 between successive chrominance sampled values, between B and C, for example, as seen in FIG. 5A. FIG. 5B illustrates a timing chart of S1 and S2 switch states needed to generate the desired coefficients for x and y as described above. As can be seen, the output of switch S1 is either B or C, with B connected to switch S1 at pole F and C connected to pole E. The output of switch S1 is coupled to a divide by 4 divider 60, and also to a pole J of switch S2. The output of switch S2 is a data register 62 which is clocked at 83.3 nanoseconds by a clock 64 for output of a digital chrominance sampled value every 83.3 nanoseconds, a 12 MHz rate. The A output of shift register 56 is coupled to adder 66 along with the D line. The resultant is divided by 8 in divider 68 and coupled to adder 70. Lines B and C are also coupled to an adder 72 whose output is coupled to a divide by 2 divider 74 and also coupled to adder 70. The output of adder 70 is the function $\tfrac{1}{2}(B+C) - \tfrac{1}{8}(A+D)$. This function is coupled to adder 76 whose other input is the divide by 4 divider 60 and the output of this adder is coupled to pole H of switch S2.

Further delineation of the specifics of construction for such a digital filter circuit are not needed, such specifics being conventional in the art. However, it should be noted that the 8-bit shift registers can be implemented with Texas Instruments integrated circuit 74S374 Chips, the adders with T1 74S283 chips, and the digital switches S1 and S2 with T1 SN74S157 chips.

FIG. 6 illustrates a diagram of the frequency spectrum of the chrominance signal augmented by digital filter 50 according to the present invention as output by a D to A converter. Note in FIG. 6 that the main alias is now centered at 12.0 MHz, with only a fairly low amplitude 4.0 MHz spectrum second alias generated as a result of least significant bit (L.S.B.) and rounding errors generated by the digital filter. Consequently, it can be seen that the only analog filtering requirement for such a signal would be to further attenuate the 4.0 MHz spectrum if necessary, and to attenuate all frequencies above 10 MHz. Such a filter could be easily made flat to 2 MHz, and would therefore not degrade the system response of the chrominance signal.

It is of course understood that although a preferred embodiment of the present invention has been illustrated and described, various modifications, alternatives and equivalents thereof will become apparent to those skilled in the art and, accordingly, the scope of the present invention should be defined only by the appended claims and equivalents thereof.

What is claimed is:

1. An apparatus for digitally filtering a digitized chrominance signal and a digital component television system comprising:
   means for digitally computing at least one intermediate value between adjacent successive chrominance sampled values of said digitized chrominance signal, said intermediate value being determined from a functional relationship defined by a predetermined characteristic of said digitized chrominance signal; and
   means for combining each said intermediate value with said chrominance sampled values to produce a digital chrominance signal of higher effective sampling rate.

2. In a digital component television system including a digitized luminance signal having a higher sampling rate than each digitized chrominance signal in a given television signal, an apparatus for digitally filtering each said digitized chrominance signal comprising:

means for digitally computing at least one intermediate value between adjacent successive chrominance sampled values of each said digitized chrominance signal, said intermediate value being determined from a functional relationship defined by a predetermined characteristic of each said digitized chrominance signal; and means for inserting each said computed intermediate value at a predetermined point in time between its respective said adjacent chrominance sampled values to produce a digital chrominance signal of high effective sampling rate from each said digitized chrominance signal.

3. The apparatus of claim 2 wherein said means for digitally computing intermediate values comprises means for computing a predetermined number of said intermediate values between each successive chrominance samples values, such that the combined number of chrominance sampled values and intermediate values equals the number of samples per second of said digitized luminance signal.

4. The apparatus of claim 2 wherein said means for digitally computing at least one intermediate value further comprises means for adjusting the value of each said calculated intermediate value such that sine x/x losses existing in said digitized chrominance signal are substantially reduced.

5. The apparatus of claim 2 wherein said means for digitally computing at least one intermediate value further comprises means for adjusting the value of each said calculated intermediate value to thereby compensate said digital chrominance signal for any Gaussian attenuation loss existing in said signal in its pass band.

6. The apparatus of claim 2 wherein said means for digitally computing at least one intermediate value further comprises means for adjusting the value of each said calculated intermediate value such that alias components existing in said digitized chrominance signal are substantially reduced.

7. In a digital component television system including a digitized luminance signal having a higher sampling rate than each digitized chrominance signal in a given television signal, an apparatus for digitally filtering each said digitized chrominance signal comprising:

means for digitally computing at least one intermediate value between adjacent successive chrominance sampled values of each said digitized chrominance signal, the amplitude of each said intermediate value being computed to enable reduction of transient response and sampling errors in each said digital chrominance signal when each said intermediate value is incorporated in said chrominance signal; and means for inserting each said computed intermediate value at a predetermined point in time between its respective said adjacent chrominance sampled values to produce a digital chrominance signal of higher effective sampling rate.

8. In a ditial component television system including a digitized luminance signal having a higher sampling rate than each digitized chrominance signal in a given television signal, a method of filtering each said digitized chrominance signal comprising the steps of:

(a) digitally computing at least one intermediate value between adjacent successive chrominance sampled values of each said digitized chrominance signal, said intermediate value being determined from a functional relationship defined by a predetermined characteristic of each said digitized chrominance signal; and (b) inserting each said computed intermediate value at a predetermined point in time between its respective said adjacent chrominance sampled values to produce a digital chrominance signal of higher effective sampling rate from each said digitized chrominance signal.

9. The method of claim 8 further comprising the step of:

(c) converting each said digitized chrominance signal as augmented with said intermediate values into an analog signal at the higher frequency enabled by said intermediate values.

10. The method of claim 8 wherein the step of digitally computing an intermediate value includes the step of digitally modifying the amplitude of each said intermediate value such that sine x/x losses existing in each said digitized chrominance signal are substantially eliminated when said intermediate values are incorporated in each said chrominance signal.

11. In a digital component television system including a digitized luminance signal having a higher sampling rate than each digitized chrominance signal in a given television signal, a method of filtering each said digitized chrominance signal comprising the steps of:

(a) digitally computing intermediate values between adjacent successive chrominance sampled values of each said digitized chrominance signal such that said sampled and computed values occur at the same sampling rate as the digitized luminance signal;

(b) digitally modifying the amplitude of said intermediate values to substantially reduce alias and other signal errors in each said digital chrominance signal; and (c) clocking out each successive intermediate value at a predetermined point in time between said successive chrominance sampled values used to compute said intermediate value.

12. The method of claim 11 wherein the step of computing said intermediate values includes simultaneously sampling the values of a plurality of adjacent said sampled values and using said values in said computations.

13. In a digital component television system including a digitized luminance signal having a higher sampling rate than each digitized chrominance signal in a given television signal, an apparatus for digitally filtering each said digitized chrominance signal comprising:

means for digitally computing at least one intermediate value between adjacent successive chrominance sampled values of each said digitized chrominance signal, said means including a plurality of input byte shift registers, each register connected in series and of a size to store one of said digitized chrominance sampled values, means for clocking each said chrominance sampled values serially through each said shift register at a clock rate equal to the sampling rate of each said digitized chrominance signal, and digital arithmetic computation means for computing each said intermediate value from the chrominance sampled values as output from one or more shift registers; and means for inserting each said computed intermediate value at a predetermined point in time between its respective said adjacent chrominance sampled values to produce a digital chrominance signal of higher effective sampling rate, said inserting means including an output register, means for clocking said output register at a clock rate equal to the sampling rate of said digitized luminance signal, and means for coupling said chrominance sampled values and said intermediate values to said output register at predetermined points in time such that a selected one of said values is output from said register at the point in time corresponding to each said luminance sampled value.

* * * * *